(12) United States Patent
Abeyasekera

(10) Patent No.: US 11,434,871 B2
(45) Date of Patent: Sep. 6, 2022

(54) BLACK START RESTORATION

(71) Applicant: MHI VESTAS OFFSHORE WIND A/S, Aarhus N (DK)

(72) Inventor: Tusitha Abeyasekera, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/964,396

(22) PCT Filed: Jan. 24, 2019

(86) PCT No.: PCT/DK2019/050028
§ 371 (c)(1),
(2) Date: Jul. 23, 2020

(87) PCT Pub. No.: WO2019/145006
PCT Pub. Date: Aug. 1, 2019

(65) Prior Publication Data
US 2021/0047997 A1 Feb. 18, 2021

(30) Foreign Application Priority Data
Jan. 25, 2018 (DK) .......................... PA 2018 70053

(51) Int. Cl.
*F03D 7/02* (2006.01)
*F03D 7/04* (2006.01)

(52) U.S. Cl.
CPC .......... *F03D 7/0284* (2013.01); *F03D 7/048* (2013.01)

(58) Field of Classification Search
CPC ........ F03D 7/0284; F03D 7/048; F03D 7/026; H02J 3/44; H02J 3/381; H02J 2300/28;
(Continued)

(56) References Cited

U.S. PATENT DOCUMENTS

2008/0284172 A1* 11/2008 Nielsen .................. F03D 7/048
290/44
2009/0021013 A1* 1/2009 Andresen ................. H02J 3/50
290/44
(Continued)

FOREIGN PATENT DOCUMENTS

CN 106329562 A 1/2017
CN 107069805 A 8/2017
(Continued)

OTHER PUBLICATIONS

Liu et al., A feasibility Study of Applying Storage Based Wind Farm as Black-Start Power Source in Local Power grid, 2016 International Conference on Smart Grid and Clean Energy Technologies (Year: 2016).*

(Continued)

*Primary Examiner* — Darrin D Dunn
(74) *Attorney, Agent, or Firm* — Patterson + Sheridan, LLP

(57) ABSTRACT

Embodiments herein described provide systems and techniques for performing black start operations. For example, one embodiment provides a method for performing black start operations. The method generally includes operating a wind turbine in a wind park in a first mode to provide power to an alternating-current (AC) grid using a control system. The control system may include a reactive power control leg and an active power control leg. The method also includes switching operation of the wind turbine from the first mode to a second mode based on an indication to perform a black start of an electrical grid and by activating a controller with an integral action to thereby increase output power of the wind turbine, the controller being coupled between the reactive power control leg and the active power control leg, (Continued)

and providing power to the electrical grid while operating in the second mode.

20 Claims, 10 Drawing Sheets

(58) Field of Classification Search
CPC .......... H02J 2300/10; H02J 3/36; H02J 11/00; Y02E 60/60; Y02E 10/76; Y02E 10/72; F05B 2270/337
See application file for complete search history.

(56) References Cited

U.S. PATENT DOCUMENTS

| | | | | |
|---|---|---|---|---|
| 2011/0157923 | A1* | 6/2011 | Ren | H02M 3/33507 363/21.12 |
| 2013/0154262 | A1* | 6/2013 | Tripathi | F03D 7/026 290/44 |
| 2014/0008912 | A1* | 1/2014 | Gupta | F03D 9/255 290/44 |
| 2014/0321175 | A1* | 10/2014 | Adest | H02J 1/102 363/49 |
| 2015/0123404 | A1 | 5/2015 | Hjort | |
| 2015/0137520 | A1 | 5/2015 | Garcia | |
| 2015/0263569 | A1* | 9/2015 | Brogan | F03D 9/11 290/44 |
| 2015/0333517 | A1* | 11/2015 | Paquin | G05B 11/01 700/286 |
| 2017/0009745 | A1* | 1/2017 | Brogan | F03D 7/00 |
| 2019/0258212 | A1* | 8/2019 | Morton | H02J 3/14 |

FOREIGN PATENT DOCUMENTS

| | | |
|---|---|---|
| CN | 107076111 A | 8/2017 |
| CN | 107104463 A | 8/2017 |
| CN | 107453397 A | 12/2017 |
| EP | 1909371 A2 | 4/2008 |
| EP | 2605356 A1 | 6/2013 |
| JP | 2016123196 A | 7/2016 |
| TW | I311174 B | 6/2009 |
| TW | M491085 U | 12/2014 |
| WO | 2017167784 A1 | 10/2017 |
| WO | 2017202428 A1 | 11/2017 |
| WO | 2019145006 A1 | 8/2019 |

OTHER PUBLICATIONS

Dai et al., Black Start Technology for Local Power Grid via PMSG-based Wind Power Generation, IEEE, 2017 (Year: 2017).*
Jain, Anubhav; Das, Kaushil; Göksu, ömer; Cutululis, Nicolaos Antonio, "Control Solutions for Blackstart Capability and Islanding Operation of Offshore Wind Power Plants," Proceedings of 17th wind Integration workshop, Dated: Oct. 17, 2018 Year: 2018, pp. 1-7.
Thormson, Jamie; Talbot, Ian, "Black Start capability in the Wind Turbine Market," Systems and Engineering Technology, Dated: Jan. 10, 2018, pp. 1-16.
ELIA—National Control Center & Market Development, "Study on the Review of the Black Start Ancillary Services," Non-Confidential version for public consultation. dated: Oct. 8, 2018, pp. 1-66.
PCT: Notification of Transmittal of the International Search Report and the Written Opinion of the International Searching Authority, or the Declaration. Application No. PCT/DK2019/050028, dated Mar. 6, 2019, pp. 1-18.
Danish Patent and Trademark Office, 1st Technical Examination of Patent Application PA 2018 70053, dated Aug. 8, 2018 pp. 1-8.
European Patent Office, Communication pursuant to Article 94(3) EPC for Application 19 702 802.0-1202 dated Mar. 2, 2022.
Taiwan Patent Office, Search Report for Taiwanese Application 108102735 dated May 9, 2022.

* cited by examiner

US 11,434,871 B2

BLACK START RESTORATION

BACKGROUND

Field of the Invention

Embodiments presented in this disclosure generally relate to power restoration, and more specifically, to performing a black start of an electrical grid.

Description of the Related Art

Off-shore wind turbines are desired in many situations instead of on-shore wind turbines since stronger wind speeds are typically available offshore when compared to land. Moreover, offshore wind turbines are not obstructed by trees, hills, buildings, etc. To couple the offshore wind turbines to an onshore grid (which may be located tens or hundreds of kilometers away), a wind turbine operator may use a high-voltage direct-current (HVDC) link. The onshore grid may be connected to an onshore wind park which may experience a black out condition, due to one of several factors. In some cases, national grid operators allocate standby power sources to perform a black start of the wind park experiencing a blackout condition.

SUMMARY

One embodiment of the present disclosure provides a method for performing black start operations. The method generally includes operating a wind turbine in a wind park in a first mode to provide power to an alternating-current (AC) grid using a control system. The control system may include a reactive power control leg and an active power control leg. The method also includes switching operation of the wind turbine from the first mode to a second mode based on an indication to perform a black start of an electrical grid and by activating a controller with an integral action to thereby increase output power of the wind turbine, the controller being coupled between the reactive power control leg and the active power control leg, and providing power to the electrical grid while operating in the second mode.

One embodiment of the present disclosure provides a wind turbine. The wind turbine generally includes a control system having a reactive power control leg, an active power control leg, and a controller with an integral action, the controller being selectively coupled between the reactive power control leg and the active power control leg. In certain embodiments, the control system is configured to operate the wind turbine in a first mode to provide power to a local AC grid, switch operation of the wind turbine from the first mode to a second mode based on an indication to perform a black start of an electrical grid and by activating the controller to thereby increase the power output by the wind turbine, and provide power to the electrical grid while operating in the second mode.

One embodiment of the present disclosure provides a control system for a wind turbine. The control system generally includes a processor, and a memory configured to store a program, which when executed by the processor performs an operation. The operation includes operating a wind turbine in a first mode to provide power to a AC grid using a control system, where the control system includes a reactive power control leg and an active power control leg. The operations also include switching operation of the wind turbine from the first mode to a second mode based on an indication to perform a black start of an electrical grid and by activating a controller with an integral action to thereby increase the power output by the wind turbine, the controller being coupled between the reactive power control leg and the active power control leg, wherein, when in the second mode, and provide power to the electrical grid after switching operation while operating in the second mode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
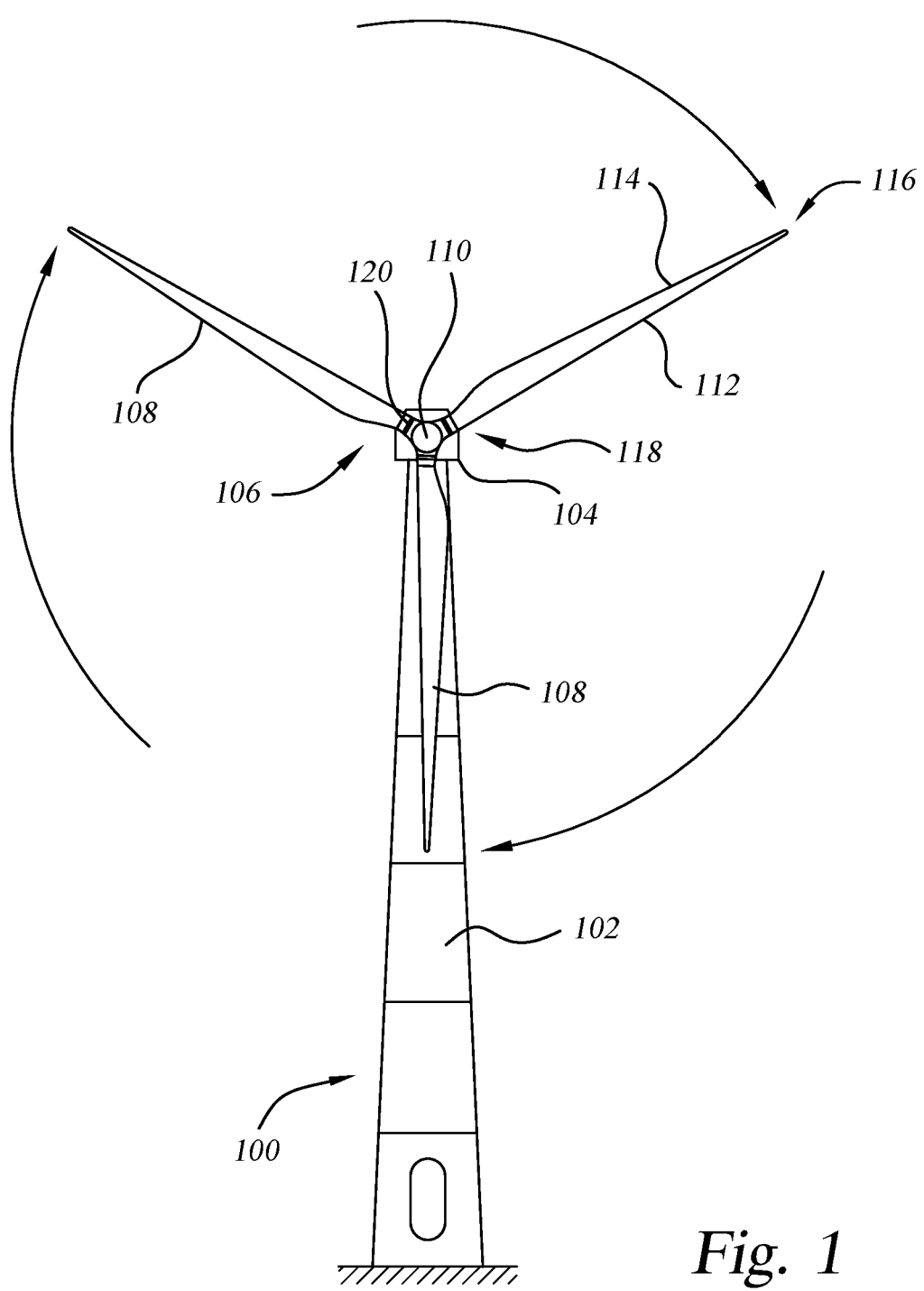
FIG. 1 illustrates a diagrammatic view of a wind turbine, according to an embodiment described in this present disclosure.

Certain embodiments of the present disclosure are generally directed to techniques for energizing an offshore wind turbine park array, offshore sub-station, and power export cable, to be used as a black start block load source for an onshore grid which has lost power. In one embodiment, the offshore wind turbine park may be used to energize blacked-out physical islands, other offshore wind park units in a larger meshed grid, and/or other offshore wind park(s) connected to high-voltage direct-current (HVDC) inter-connectors between different synchronous zones.

With increased use of dependency of electricity in almost all aspects of city infrastructure, it is important to restore a loss of power (black-out), which may be caused by cascaded faults, as soon as possible. Therefore, national grid operators in many countries allocate standby power sources, typically capable of supplying block loads of 30-40 mega-vats (MW) and having reactive power capability, to perform a black start of the electrical grid within two hours (e.g., by using coal or gas plants), to restore electrical power in blacked-out areas, prior to re-synchronizing those areas with the rest of the grid.

With plans to shut down fossil power plants, the number of standby power sources may decline in the near future. Certain embodiments of the present disclosure are generally directed to techniques for filling this void by supplying black start power from offshore wind parks having onshore points of common coupling (FCC) spread widely across shorelines. Many offshore wind parks can provide block load black start power of greater than 60 MW, although this can vary depending on the time of year.

Certain embodiments of the present disclosure provide a control system for offshore wind turbines configured to provide power to an HVDC link to be used for black start operations. In some cases, instead of using a central control system, each wind turbine may have an individual control system. During normal operation, the control system of the wind turbines may operate in a grid-following mode in which the wind turbine injects current to a stiff main grid where voltage and frequency are fixed. However, in some cases, the main grid may experience a black out condition, after which the control system may be operated in two different modes. For example, the control system may be operated in a first mode, which may be referred to as grid-forming mode, in which the wind turbine switches to creating its own voltage at a given frequency at the wind turbine output. In the grid-forming mode, the wind turbine (and subsequently the entire wind park) forms its own local grid. Using grid-forming mode, the wind turbines can also be considered to be in what is referred to herein as island mode, since the wind turbine is isolated from a classical electrical grid (e.g., the main grid). In the island mode, the wind turbines in the wind park can either provide auxiliary power to themselves or auxiliary power to a wind park platform hardware. The island mode may be used when the wind turbine is not transmitting power on the HVDC link or HVAC link. Instead, the island mode permits the wind turbines in the park to generate power for auxiliary control such as yawing the turbines, cooling pumps, ventilators, air conditioning loads, UPS and electronic loads. In another example, the wind turbines may be coupled to a local AC grid and can use the island mode to output power to the local grid. The control system may also operate in a second mode, which may be referred to as a high-power mode. In the high-power mode, the wind turbines increase their output power in order to perform black start operations by providing power to the HVDC link.

In one embodiment, to switch between the island and high-power modes, a wind turbine activates a proportional-integral (PI) controller that is coupled between a reactive power control leg and an active power control leg in its control system. The PI controller receives as an input the difference between a desired active power value and the actual active power value generated by wind turbine and outputs a corresponding voltage adjustment. This voltage adjustment is then used in the reactive power control leg to change the magnitude of a voltage value. In one embodiment, when switching from the island mode to the high-power mode, the wind turbine activates the PI controller which increases the output power of the wind turbine.

EXAMPLE EMBODIMENTS

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
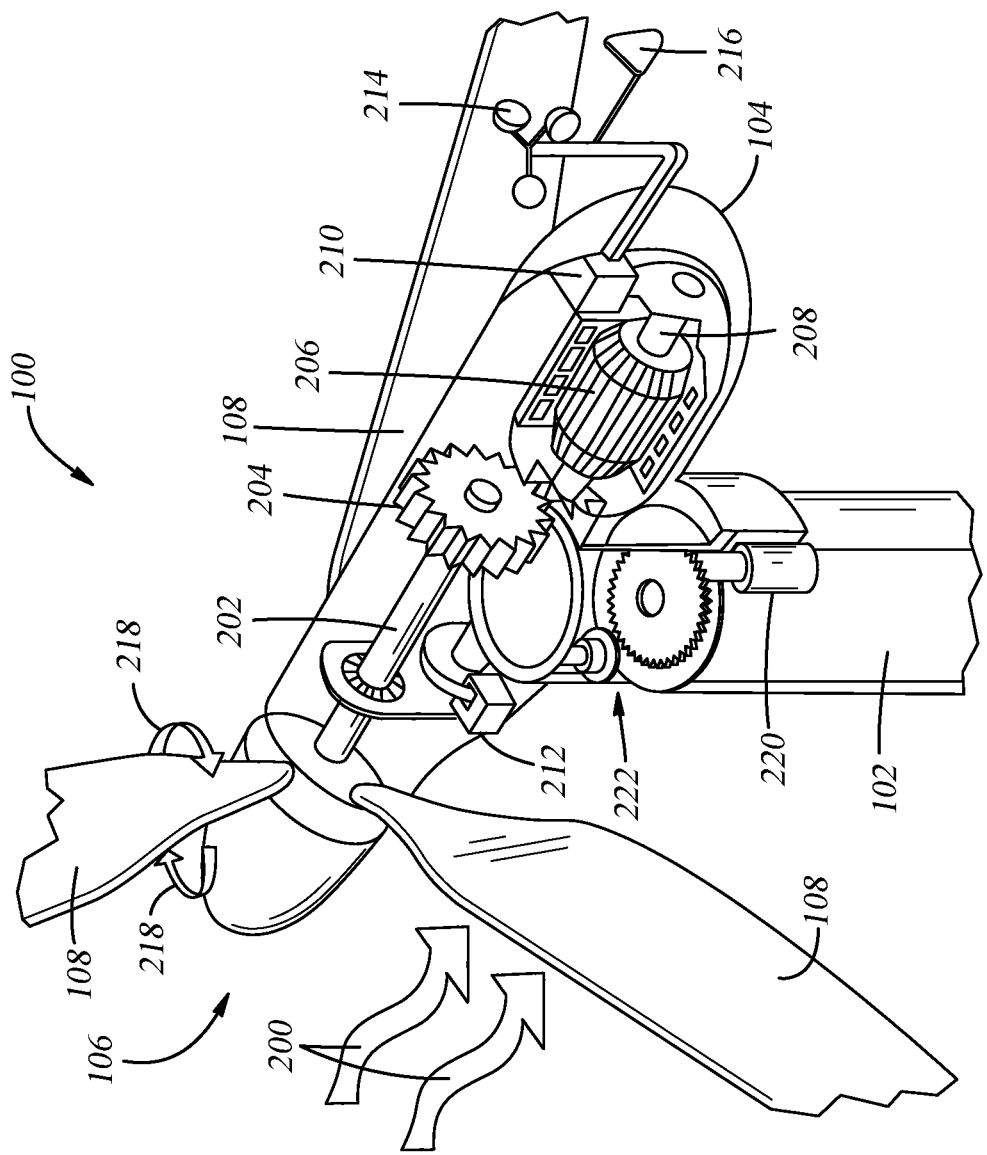
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
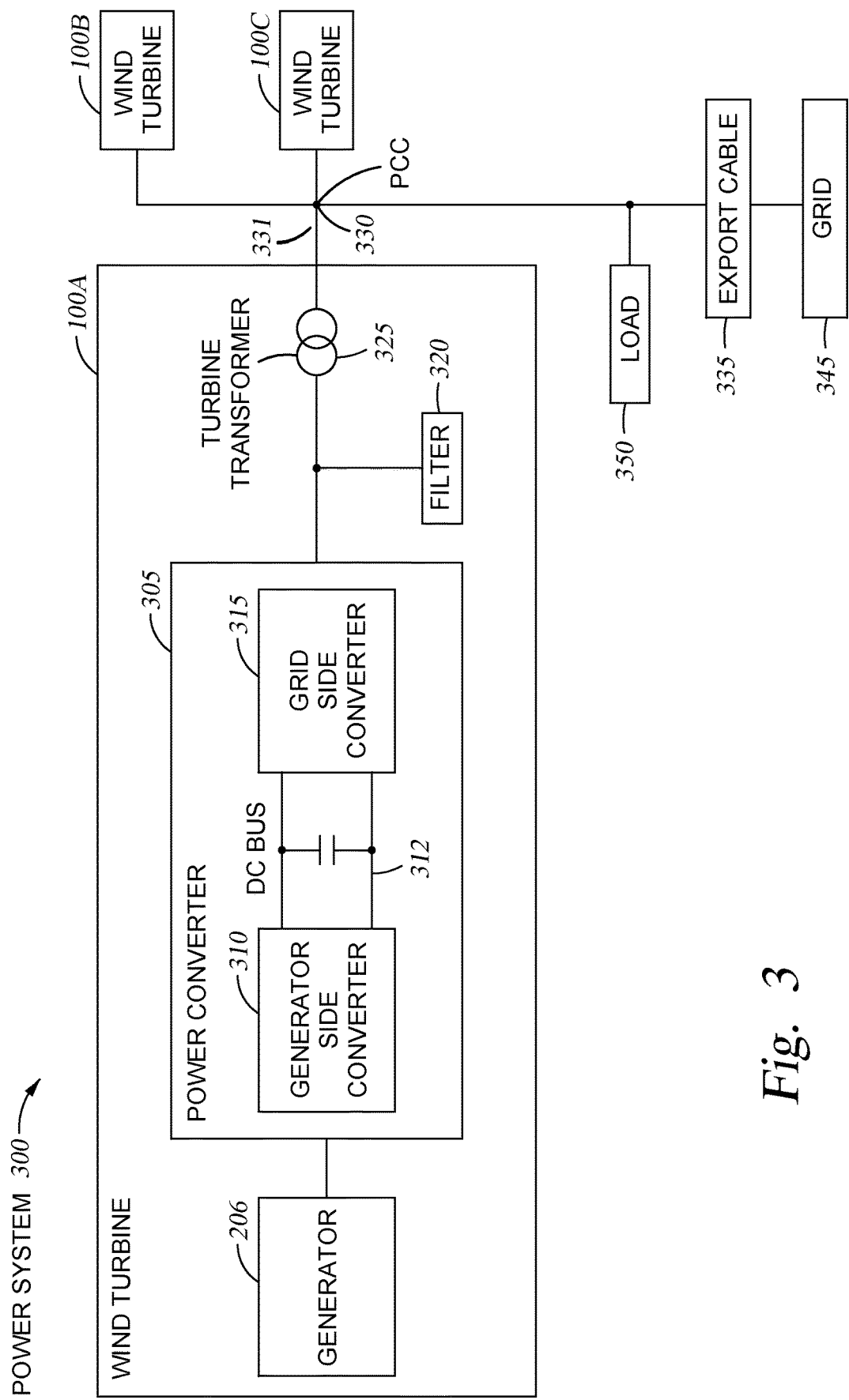
FIG. 3 is a block diagram of a power system according to an embodiment described in this present disclosure.

FIG. 3 is a block diagram of a power system 300 according to an embodiment described in this present disclosure. The power system 300 includes wind turbines 100A-1000 coupled, via an alternating-current (AC) grid 331, to an export cable 335 at a point of common coupling (FCC) 330. The export cable 335 is in turn coupled to the grid 345. In one embodiment, the wind turbines 100 are located in an offshore wind park while the grid 345 is an onshore electrical grid. However, in other embodiments, both the wind park and the grid 345 may be onshore. That is, the embodiments described herein are not limited to offshore wind parks but can be used by onshore wind parks to perform black start.

The wind turbine 100A includes a generator 206 for generating AC power, a power converter 305 for converting the AC signals provided by the generator 206 into a desired frequency, and a filter 320 for removing noise and harmonics from the output of the converter 305. As shown, the power converter 305 includes a generator-side converter 310 and a grid side converter 315 coupled together via a direct-current (DC) bus 312. In one embodiment, the generator-side converter 310 includes a plurality of switches (e.g., power transistors) which convert the AC signals provided by the generator 206 into DC power that is transmitted on the DC bus 312. The grid side converter 315 receives the DC power and uses switches to convert the DC power back into an AC power (e.g., three-phase AC power) with a desired frequency (e.g., 50 Hz or 60 Hz). Although not shown, the wind turbines 100B and 100C may have a similar arrangement as the wind turbine 100A. The wind turbines 110A, 100B, and 100C may be connected using a cable array.

The wind turbine 100A includes a turbine transformer 325 that couples the wind turbine 100A to the PCC 330, via the alternating-current (AC) grid 331. In one embodiment, the grid transformer 325 is within the wind turbine 100A e.g., within the tower. Moreover, although not shown, the wind turbines 100E and 100C can also be coupled to the alternating-current (AC) grid 331 and to the PCC 330 using respective turbine transformers.

The outputs of the turbine transformers form a local AC grid. As described in more detail below, in a first mode of operation (e.g., the island mode), one or more of the wind turbines 100 provides power to a load 350 couple to the local AC grid. For example, although the wind turbines 100 can be located offshore, the turbines 100 can be coupled to a local load 350 such as a nearby populated land mass. Thus, even when the wind turbines 100 are not transmitting power on the grid 345, the wind turbines 100 can be supplying power to the local load 350. Furthermore, when in the island mode, one or more of the wind turbines 100 can supply auxiliary power for the remaining turbines 100 in the park. For example, a few of the wind turbines 100 can still generate power using the island mode of operation to provide auxiliary power to yaw the remaining turbines 100 or run pumps in the turbines 100. This avoids having to have alternative power supplies (e.g., diesel generators) in an offshore wind park to provide auxiliary power when the wind turbines are not providing power to the grid 345, In certain embodiments, to provide power to the grid 345 for black start operations, the wind turbines 100 switch to a second mode of operation (e.g., the high-power mode) to increase their combined power output at the FCC 330 to exceed a threshold voltage required to provide power to the grid for black start operations. If a grid fault occurs when switching from the first mode to the second mode it may be advantageous to switch to a third mode when the fault is detected, wherein the third mode comprise a current limited such that the turbine follows the grid in such that it will not provide maximum current but only the current that is requested. Thus, protecting itself.

Figure 4:
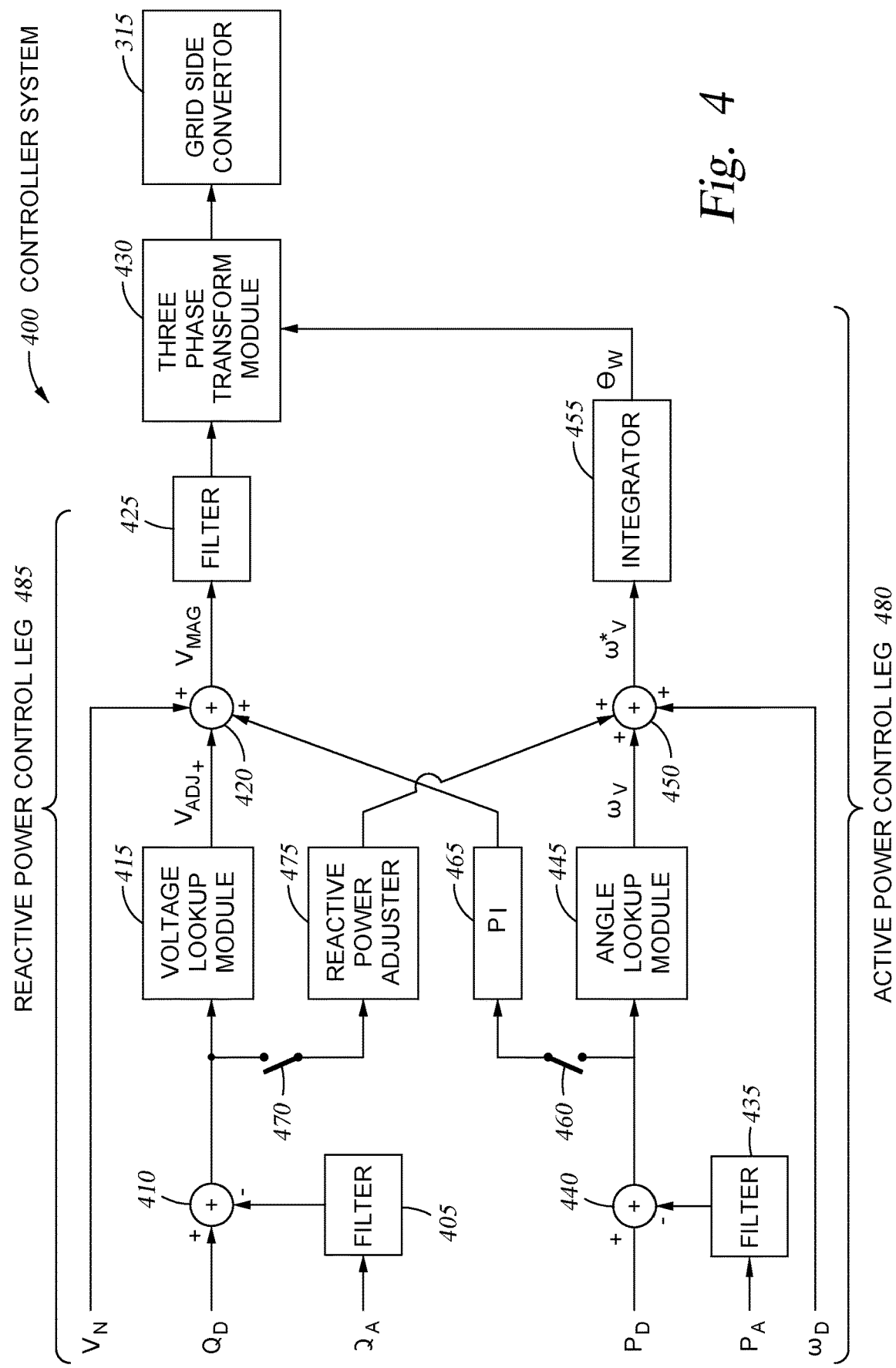
FIG. 4 illustrates a control system of a wind turbine according to an embodiment described in this present disclosure.

FIG. 4 illustrates a control system 400 of a wind turbine according to an embodiment described in this present disclosure. In one embodiment, each wind turbine in a wind park includes a control system as described in accordance with FIG. 4. The control system 400 may be controlled by a wind turbine controller and may be implemented using solely software, solely hardware, or some mixture of software and hardware elements. In one embodiment, the control system 400 is implemented using a computing system that includes one or more processors and memory.

One advantage of the control system 400 is that it may not use high speed data communication between the control systems 400 in the individual wind turbines of the wind park. That is, the control systems 400 in the individual wind turbines do not need to be synchronized during operation, although the individual control systems 400 may receive reference set points from a central wind park controller. By not requiring communication between the different control systems 400, the reliability of the control system 400 is increased. Moreover, the control system 400 does not need a phase locked loop (PLL) for operation unlike systems that require communication between the control systems in the wind turbines.

The control system 400 has a reactive power control leg 485 and an active power control leg 480. The reactive power control leg 485 receives a desired reactive power value $Q_D$ from the wind park controller and an actual reactive power value $Q_A$ which represents the current reactive power being generated at the output of the grid side converter 315. The actual reactive power value $Q_A$ is passed through an optional filter 405 and is provided to a first adder 410 along with the desired reactive power value $Q_D$, The first adder 410 determines the difference between the desired reactive power value $Q_D$ (i.e., the reactive power the wind park controller wants the wind turbine to output) and the actual reactive power $Q_A$ currently outputted from the wind turbine. This difference is inputted to a voltage lookup module 415 which outputs a voltage adjustment value $V_{ADJ}$ used for adjusting the output voltage of the wind turbine. In one embodiment, the voltage lookup module includes a plurality of incremental voltage values that are mapped to respective differences between the desired and actual reactive power values. The plurality of voltage values for each control system 400 in the various wind turbines may be different, or the same, voltage values. That is, the voltage values for the voltage lookup module 415 in one wind turbine may be different than the voltage values in a second wind turbine.

A second adder 420 adds the voltage adjustment value $V_{ADJ}$ to a nominal voltage $V_N$ (which may be provided by the wind park controller) to output a magnitude voltage $V_{MAG}$. The second adder 420 is also coupled to a controller with an integral action e.g. a PI controller 465 which will be described later. The magnitude voltage $V_{MAG}$ is passed through an optional filter 425 and to a three-phase transform module 430. Generally, the three-phase transform module 430 converts the magnitude voltage $V_{MAG}$ and a voltage factor angle θw outputted by the active power control leg 480 to control signals for the grid side converter 315. Put differently, the transform module 430 uses the outputs of the reactive and active power control legs 480 and 485 to generate control signals that operate the switches (e.g., power transistors) in the grid side converter 315 to output corresponding three-phase AC voltage signals.

In the active power control leg 480, the control system 400 receives a desired active power value $P_D$ from the wind park controller and an actual active power value $P_A$ which represents the current active power outputted by the grid side converter 315. The actual active power value $P_A$ is passed through an optional filter 435. A third adder 440 compares the desired active power value $P_D$ to the actual active power value $P_A$ and outputs a difference of the two. This difference is provided to an angle lookup module 445 which outputs a corresponding angle adjustment $\omega_V$, The angle lookup module 445 may include a plurality of incremental angle adjustment values that correspond to respective differences between the actual and desired active power values $P_A$ and $P_D$. The angle adjustment values stored in the angle lookup module 445 can be the same, or different, for the different wind turbines in the park.

The angle adjustment $\omega_V$ outputted by the angle lookup module 445 is passed to a fourth adder 450 which combines the angle adjustment $\omega_V$ with a desired angle $\omega_D$ received from the wind park controller. While the magnitude voltage $V_{MAG}$ outputted by the reactive power control leg 485 controls the magnitude of the AC signal generated by the grid side converter 315, the angles $\omega_V$ and $\omega_D$ control the frequency of the AC signals. For example, the desired angle $\omega_D$ may represent the desired frequency of the local AC grid (e.g., 50 Hz). The control system 400 uses the angle adjustment $\omega_V$ to increase or decrease the active power generated by the grid side converter to match the desired active power value $P_D$.

The fourth adder 450 outputs a combined angle $\omega_V^*$ to an integrator 455 which outputs the voltage factor angle $\theta_W$. The voltage factor angle $\theta_W$ along with the magnitude voltage $V_{MAG}$ are used by the three-phase transform module 430 to generated control signals that set the magnitude and frequency of a three-phase AC signal outputted by the grid side converter 315.

The control system 400 also includes a switch 460 that selectively couples the output of the third adder 440 to the PI controller 465 and a switch 470 which selectively couples the output of the first adder 410 to a reactive power adjustor 475, When operating in the island mode, the switches 460 and 470 are open thereby deactivating the PI controller 465 and the reactive power adjustor 475 such that these components do not affect the voltage factor angle $\theta_W$ and the magnitude voltage $V_{MAG}$ generated by the reactive and active power control legs 480 and 485. However, even when the PI controller 465 and reactive power adjustor 475 are deactivated, the control system 400 can still generate AC signals for powering a local load coupled to the local AC grid. As mentioned above, in the island mode, the grid side converter 315 may output AC power for a nearby populated land mass that is connected to the local AC grid. Additionally or alternatively, one or more of the wind turbines in the park may generate auxiliary power for the remaining wind turbines in the park. That is, some of the wind turbines may be shut down (i.e., not generating power) while other wind turbines operate in the island mode to provide auxiliary power for the shutdown turbines.

In one embodiment, when operating in the island mode, the control system 400 may not be able to set the actual power outputted to the wind turbine (i.e., the actual reactive and active power values $Q_A$ and $P_A$) to the desired power values (i.e., the desired reactive and active power values $Q_D$ and $P_D$). Instead, the actual power outputted by the wind turbine is dictated by the local load on the turbine.

To switch from the island mode to the high-power mode, the control system 400 closes the switches 460 and 470 thereby connecting the inputs of the PI controller 465 and the reactive power adjustor 475 to the active power control leg 480 and reactive power control leg 485, respectively. Although the control system 400 illustrates switches to connect the inputs of a controller with an integral action e.g. the PI controller 465 and the reactive power adjustor 475 to the respective legs 480 and 485, other activation means may be used such as turning on and off the power delivered to the PI controller 465 and reactive power adjustor 475.

When switch 460 is closed, the PI controller 465 receives, from the third adder 440, the difference between the desired active power value $P_D$ and the actual active power value $P_A$. Although a PI controller is shown, any controller with an integral action can be used such as the PI controller 465 or a proportion-integral-derivative (PID) controller, in other words the shown controller 465 is a controller with an integral action. The PI controller 465 outputs an adjustment voltage which is added to the magnitude voltage $V_{MAG}$ until the actual active power value $P_A$ matches the desired active power value $P_D$. In one embodiment, the PI controller 465 causes the reactive power control leg 485 to increase the magnitude of the AC signals generated by the grid side converter 315 until this magnitude reaches a voltage setting for black start operations. The control system 400 can continue to use the PI controller 465 to control the output power of the wind turbine as set by the wind park controller. That is, unlike when in the island mode, in the high-power mode, the control system 400 can control the output power to match the desired power for black start operations. For example, if the wind park controller sends a new desired active power value $P_D$, the PI controller 465 can adjust the magnitude of the AC signals to output the desired active power.

In addition to activating the PI controller 465 when operating in the high-power mode, the control system 400 also activates the reactive power adjustor 475 by closing the switch 470. Generally, the reactive power adjustor 475 prevents the formation of a circulating reactive power between the wind turbines coupled to the PCC. Because there are an infinite number of solutions depending on how much reactive power each turbine is producing, this can result in circulating reactive power. When the switch 470 is closed, the difference (or error) between the desired reactive power value $Q_D$ and the actual reactive power value $Q_A$ outputted by the adder 410 is provided to the reactive power adjustor 475. In turn, the reactive power adjustor 475 outputs an angle value that is sent to the adder 450. That is, the angle value is added to the angle adjustment $\omega_V$ and the desired angle $\omega_D$ to generate the combined angle voltage factor angle $\omega_V^*$, A large difference between the desired reactive power value $Q_D$ and the actual reactive power value $Q_A$ means the wind turbine is generating too much reactive power. Thus, the angle value generated by the reactive power adjustor 475 causes the control system 400 to reduce the reactive power being outputted by the grid side converter 315. Conversely, a small difference between the desired reactive power value $Q_D$ and the actual reactive power value $Q_A$ means the wind turbine is generating too little reactive power. In response, the reactive power adjustor 475 increases the reactive power generated by the turbine. If each control system 400 of the wind turbines includes the reactive power adjustor 475, this results in the wind turbines sharing the generation of the reactive current amongst themselves and mitigates the likelihood of a circulating reactive current.

Figure 5:
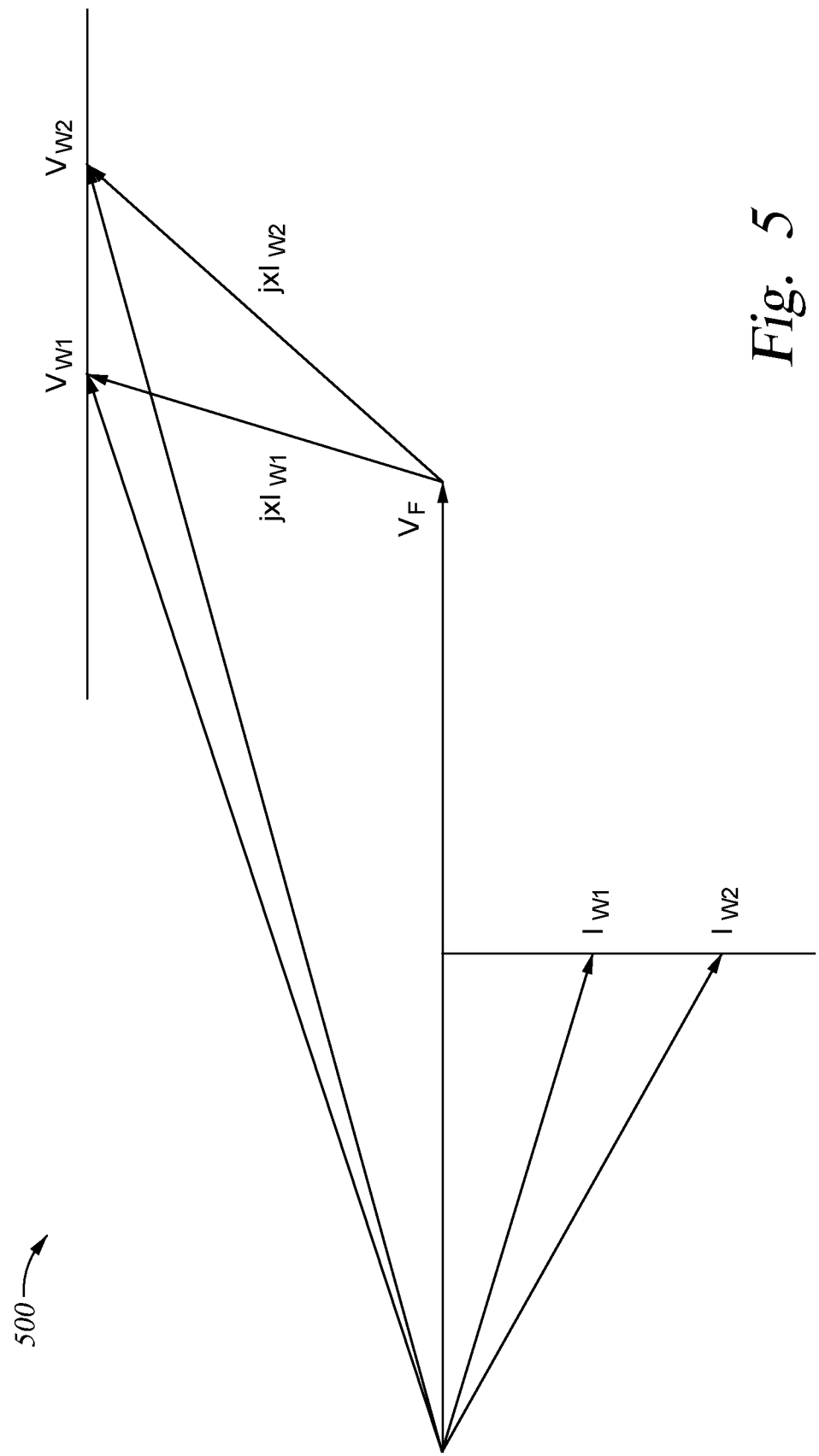
FIG. 5 is a vector diagram according to an embodiment described in this present disclosure.

FIG. 5 is a vector diagram 500 according to an embodiment described in this present disclosure. The vector $V_F$ illustrates the common voltage at the FCC while the vectors $V_{W1}$, $V_{W2}$, $I_{W1}$, and $I_{W2}$ represent respective voltages and currents for two wind turbines in the park—i.e., Wind Turbine 1 (W1) and Wind Turbine 2 (W2). The two current vectors $I_{W1}$ and $I_{W2}$ illustrate that the two wind turbines generate different reactive powers. Specifically, Wind Turbine 2 delivers more reactive power than Wind Turbine 1 which means the voltage vector $V_{W2}$ is too large. Stated differently, the angle between the vector $V_F$ and $V_{W2}$ is not optimal. As described above in FIG. 4, the control system 400 includes the reactive power adjustor 475 which can adjust the outputs of the Wind Turbine 2 such that the angle between $V_F$ and $V_{W2}$ is closer to the angle between $V_F$ and $V_{W1}$. As a result, the reactive power output is shared more equally by the wind turbines which can prevent circulating reactive current between the wind turbines.

Figure 6:
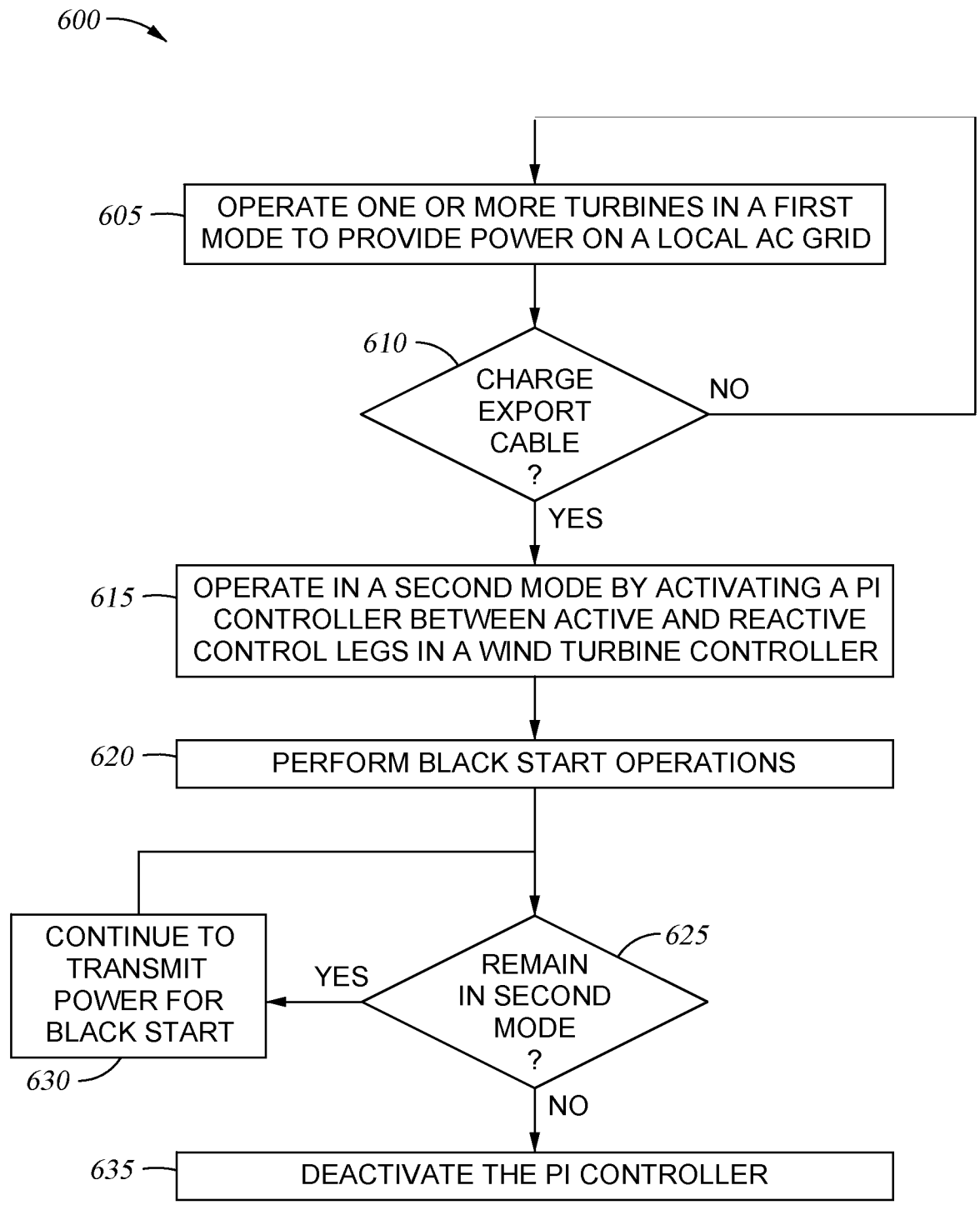
FIG. 6 is a flow chart of a method for operating a wind turbine in different modes according to an embodiment described in this present disclosure.

FIG. 6 is a flow chart of a method 600 for operating a wind turbine in different modes according to an embodiment described in this present disclosure. At block 605, a wind park controller instructs a control system in each of one or more wind turbines to operate in a first mode (e.g., island mode, or otherwise referred to as grid forming mode) to provide power to a local AC grid. In some cases, the wind turbines may operate in the first mode in response to a determination that a main grid has experienced a blackout condition, and thus, forms a local AC grid in order to provide auxiliary power for the one or more wind turbines. In one embodiment, the wind park controller instructs a subset of the wind turbines to operate in the first mode. For example, only a few of the turbines in the park may be operated in the first mode to generate auxiliary power for the remaining turbines which do not generate any power. Alternatively, all of the turbines in the park may be operated in the first mode to provide power to the local AC grid. In one embodiment, the local AC grid may also provide power to a near-by populated land mass such as an island.

If at block 610 the wind park controller determines whether to prepare for black start operations by charging the export cable, and if so, the method 600 proceeds to block 615 to provide power to the grid for black start operations. In one embodiment, the determination to activate black start operations may be based on a command from a transmission system operator (TSO) of the grid. Otherwise, the method 600 returns to block 605 where the one or more wind turbines continues to operate in the first mode.

At block 615, the wind park controller instructs at least one of the wind turbines to operate in the second mode by activating a PI controller between the active and reactive control legs in a wind turbine controller (e.g., control system 400 in FIG. 4). In one embodiment, the PI controller uses the difference (or error) between actual and desired reactive power values determined in the reactive control leg of the wind turbine controller to generate a voltage adjustment used in the active control leg of the turbine controller. The voltage adjustment increases the magnitude of the AC voltage generated by the wind turbine in order to provide sufficient power for black start operations. At block 620, the one or more wind turbines may perform the black start operations, as described in more detail with respect to FIG. 8. In one embodiment, the black start operations as described with respect to FIG. 8 may be performed after the required number of wind turbines have been energized with voltage and frequency forming according to the available wind and a block load power setting indicated by the TSO.

As used herein, the first mode of operation of the wind turbine generally refers to a grid-forming mode where the wind turbine (and subsequently the entire wind park) forms its own local grid after the main grid has experienced a blackout condition. Using the grid-forming mode, the wind turbines can also be considered to be in what is referred to herein as island mode, since the wind turbine is isolated from a classical electrical grid (e.g., the main grid). Moreover, the second mode of operation of the wind turbine generally refers to a high-power mode, where the wind turbines increase their output power in order to perform black start operations by providing power to the main grid.

Figure 7:
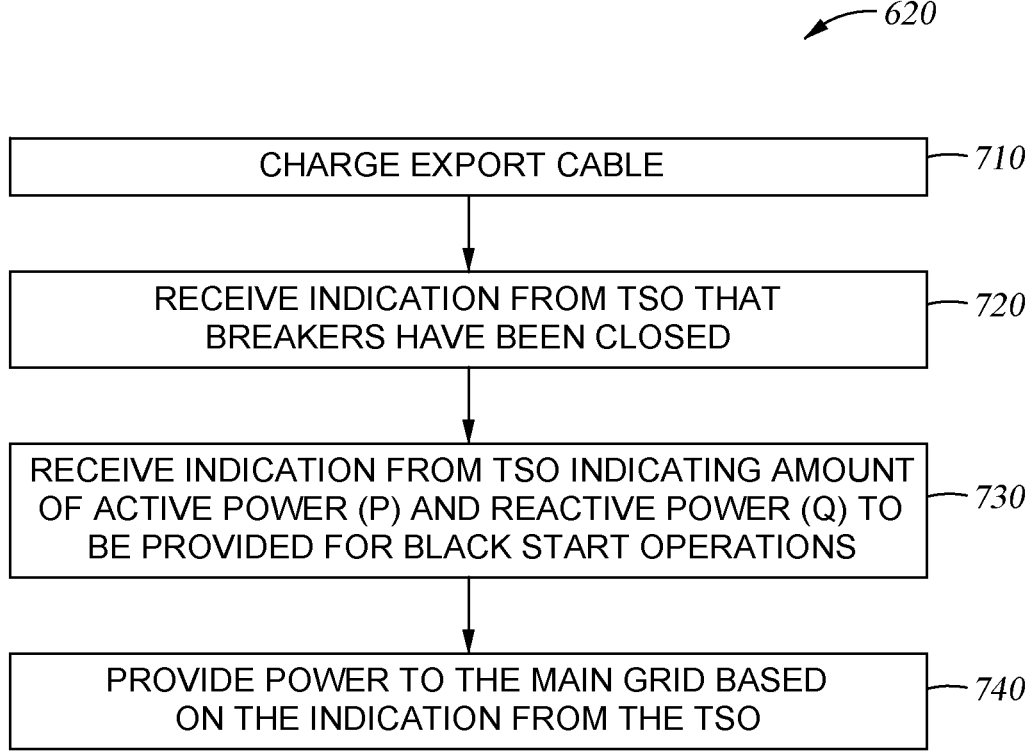
FIG. 7 is a flow chart of example black start operations, according to an embodiment described in this present disclosure.

FIG. 7 is a flow chart of example black start operations corresponding to block 620 of FIG. 6, according to an embodiment described in this present disclosure. At block 710, the wind park controller instructs the control system (e.g., control system 400) to energize the export cable used to connect the offshore wind park to the grid substation. In one embodiment, export cable energization is performed by gradually increasing the wind turbine output voltage using the control system 400 as described with respect to FIG. 4. Once the export cable is energized, the offshore wind park is in black start mode and awaits a ISO command (e.g., via the park controller) to connect to the onshore grid by closure of the onshore PCC disconnector (e.g., breakers). For example, at block 720, an indication may be received from the TSO indicating that the FCC disconnector (e.g., breaker) has been closed. At block 730, an indication may be received from the TSO indicating the amount of active power (P) and reactive power (Q) to be provided for black start operations, and at block 740, the active power (P) and reactive power (Q) may be provided at line frequency in accordance with the received ISO indication, to gradually energise and restore the main grid.

In one embodiment, when providing power for black start operations, a wind turbine that is not currently providing power for black start operations is synchronized to the wind turbines that are providing power for black start operations before coupling the wind turbine to the FCC. For example, when electrically coupling a new wind turbine to the PCC, if the angle ω in the control system of the new turbine is not synchronized, coupling the new wind turbine to the wind turbines already generating power can create a short circuit. Thus, before adding the new turbine, its control system may synchronize its value of the angle ω to the same angle value used in the control systems of the wind turbines already providing power for black start operations. Referring to FIG. 4, in one embodiment, the initial value for the integrator 455 of the new turbine is derived by measuring the phase of the voltage on the low side of the local AC grid. By initializing the integrator 455 to the initial value, the new turbine has the same angle as the currently connected wind turbines, and thus, when the new turbine is coupled to the FCC, the power at the FCC is increased and a short circuit is avoided. This synchronization process can be repeated to couple additional wind turbines to the PCC as desired.

Returning to FIG. 6, at block 625, the wind park controller determines whether the wind turbines should remain in the second mode of operation. For example, at block 630, the wind park controller may keep the individual control systems in the high-power mode so long as the main grid is in a black out scenario. If, however, the main grid has been recovered (e.g., is no longer in blackout), at block 635, the wind park controller instructs the individual control systems to deactivate the PI controller.

Although the embodiments herein describe a central wind park controller that sends commands to the individual control systems of the wind turbines (e.g., commands to switch between the first and second modes, commands containing the desired active and reactive power values, power curtailment commands, etc.), the individual control systems can operate even if the communication link between the control system and the wind park controller is lost.

In some cases, the main grid be experiencing a partial blackout, and thus, may retain a low power signal at the main grid which requires additional active/reactive power support from the offshore wind park. In this case, the wind park operating in the second mode (e.g., the high-power mode) may acquire (e.g., determine) the main grid frequency and phase angle (e.g., using a phase-locked loop (PLL)), and synchronize the frequency and phase of the offshore wind park output power signal with the main grid frequency and phase before providing power in block loads as requested by the wind park operator.

In one embodiment, the wind park controller may not energize all the wind turbines in the offshore wind park for performing the black start operations. For example, the wind park controller may energize a minimum number of wind turbines as required to provide sufficient power to black start the main grid. In some cases, the wind park controller may energize two or more of the wind turbines that are spread furthest away from each other in the wind park in order to reduce wake effects and increase the wind capture with minimum variability in wind speed for the requested black start block load value indicated by the TSO. This technique, combined with an accurate forecast of wind speed time slots, may increase the offshore wind power availability for providing the black start block loads.

Figure 8:
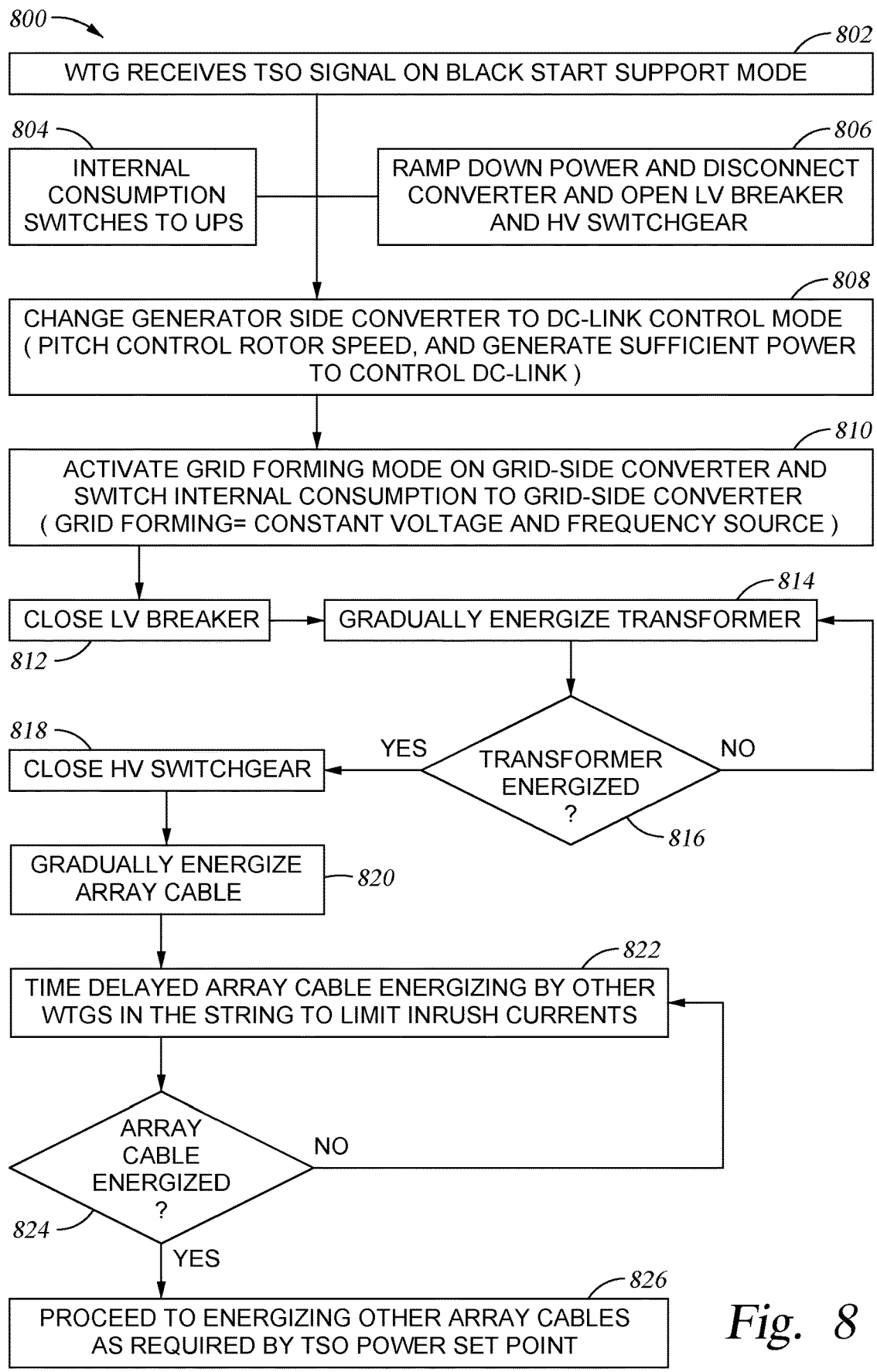
FIG. 8 is a flow diagram describing a method for initiating a grid forming mode after detecting a blackout condition accordance to an embodiment of the present disclosure.

FIG. 8 is a flow diagram describing a method 800 for initiating a grid-forming mode accordance to an embodiment of the present disclosure. At block 802, a signal may be received from TSO indicating that the offshore wind turbine is to be used for black start operations of the main grid. At block 804, internal power consumption of the wind turbine in the offshore wind park switches to UPS. For example, the power received from the UPS may be used to charge electronics, precharge the DC-link of the wind turbine, and start the wind turbine rotors in the offshore wind park. At block 806, power of the wind turbine is ramped down, and both the low voltage (LV) breaker and the high voltage switch gear are opened. The LV breaker is used to selectively couple the grid-side converter (e.g., grid-side converter 315) to the transformer (e.g., transformer 325) and the high voltage (HV) switchgear is used to selectively couple the transformer to the PCC (e.g., PCC 330) via the alternating-current (AC) grid 331.

At block 808, the generator-side converter is switched to DC-link control mode. In this mode, the generator-side converter pitch controls the rotor speed to generate sufficient power to control the DC-link. At block 810, the grid forming mode is activated by controlling (e.g., via the control system 400) the grid-side converter. Once the grid-side converter is activated, power for internal consumption of the wind turbine is received from the grid-side converter. At block 812, the LV breaker is closed, and at block 814, the transformer is gradually energized. At block 816, a wind park controller determines whether the transformer is energized, and if so, the method 800 continues to block 818 where the HV switchgear is closed.

At block 820, the array cable connecting the wind turbines in the wind park is gradually energized by the wind turbine in the wind park. At block 822, other wind turbines in the wind park also energize the array cable in a time delayed fashion to control voltage surges that may otherwise be caused by inrush currents if all the wind turbines in the wind park energize the array cable simultaneously. At block 824, a wind park controller determines whether the array cable is energized, and if so, the method 800 continues to block 826, where other array cables that may be coupling other wind turbines in the wind park are also energized. For example, depending on the power set point for performing the black start operations (e.g., as may be indicated by the TSO), a number of other array cables may be energized to meet the power demand.

While the embodiments described herein have provided example techniques for performing black start operations, the techniques described herein can also be used to provide power to neighbouring sections of offshore wind parks in an offshore meshed grid where auxiliary back-up power may be either not available or an expensive option to maintain offshore and/or where the export cable(s) may be damaged. Moreover, power may be provided to offshore wind parks that are connected to HVDC inter-connectors between different synchronous zones (e.g., an interlink between two different countries) where auxiliary back-up power may be either not available or an expensive option to maintain offshore and/or interlink power is unavailable. In one embodiment, grid-forming power may be provided to a hybrid power plant that further may be located offshore, A hybrid power plant may be a power plant that uses a mix of renewable power sources (e.g., photovoltaic, wave, and/or tidal power) as well as other power sources such as diesel or gas. The hybrid power plant may be located in an offshore power hub where point-to-point connection of wind farms are collected and transmitted onshore via an export cable.

Embodiments described herein may be used to provide black start support even during periods of low wind. These periods of low wind can be compensated for by adding storage capacity either to individual wind turbines or as a unit to the wind park. For example, additional UPS battery storage capacity may be added to each wind turbine. In one embodiment, addition energy storage units may be added to the onshore connection point of the offshore wind park. The capacity of these energy storage units may be up to 5-10% of the wind park total energy and may be incorporated in existing flexible AC transmission system units that may be used for grid compliance. These energy storage units can also be used to energise the export cable and/or offshore transformers for black start support as described herein.

Figure 9:
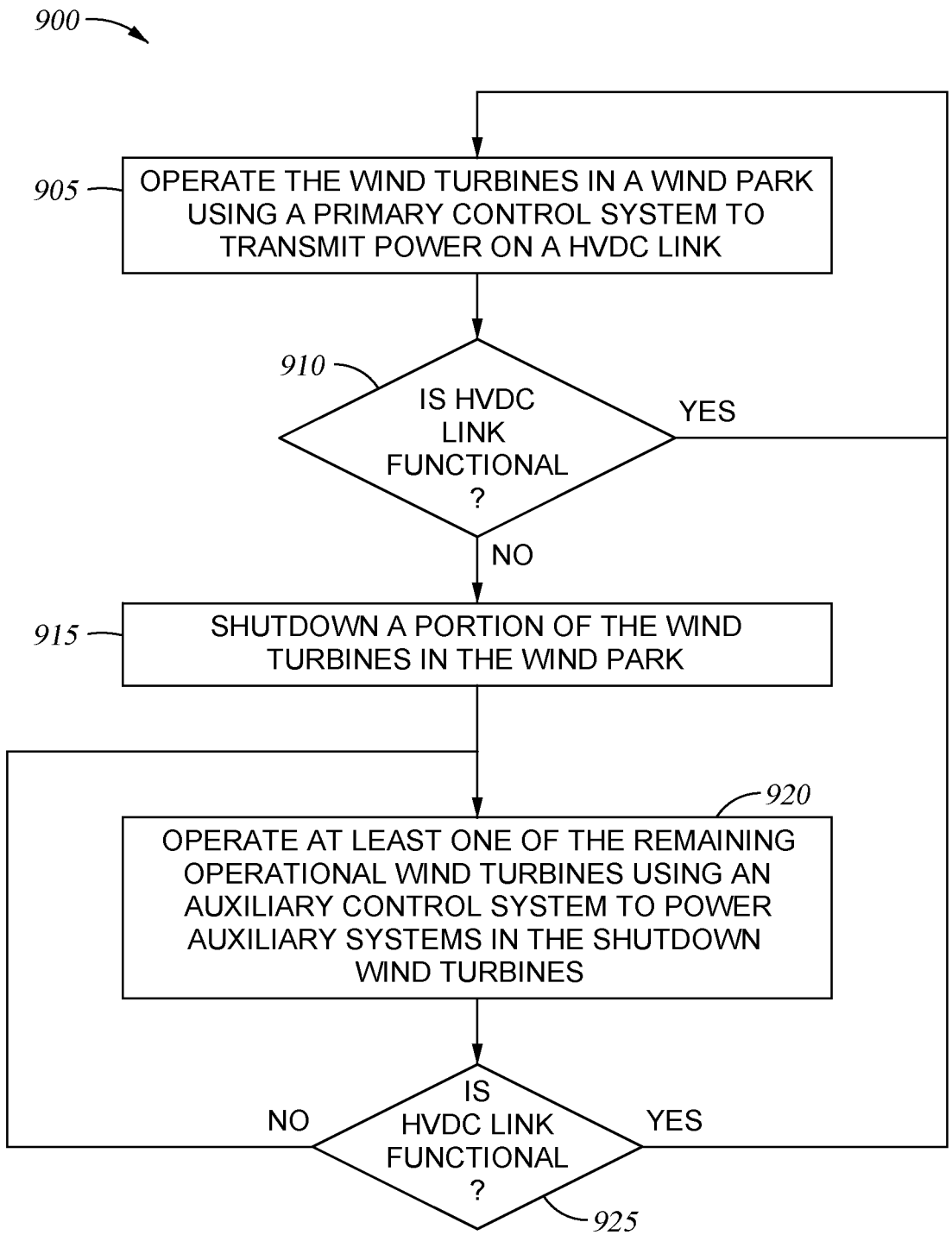
FIG. 9 is a flow diagram describing a method for shutting down one or more wind turbines due to the detection of blackout scenario of a main grid, in accordance with one embodiment of the present disclosure.

FIG. 9 is a flow diagram describing a method 900 for shutting down one or more wind turbines due to the detection of blackout scenario of a main grid, in accordance with one embodiment of the present disclosure. At block 910, a wind park controller determines if the main grid (e.g., a high-voltage direct-current (HVDC) link as will be described in more detail with respect to FIG. 10) is functional. For example, the HVDC link may be cut or an on-shore station can be disconnected thereby disconnecting the wind park from the main grid (e.g., an on-shore grid). In some cases, the grid operator may voluntary decide to disconnect the HVDC link. Thus, the HVDC link is non-functional whenever the link is not energized, whether because of an accident (e.g., the line being cut or a grid fault) or intentional (e.g., the on-shore grid is not ready to connect to the wind park). If the HVDC link remains functional, method 900 returns to block 905. However, if the HVDC link is non-functional, method 900 proceeds to block 915 where the wind park controller shut downs a portion of the wind turbines in the wind park. In this example, shutting down the wind turbines means that the wind turbines do not generate output power onto the local AC grid. However, other auxiliary systems in the wind turbines that are shut-down may still operate such as yawing motors, pumps, or heating elements for preventing ice buildup on the nacelle or blades.

At block 920, at least one of the remaining operational wind turbines in the wind park (i.e., a wind turbine that was not shutdown) uses an auxiliary control system to power auxiliary systems in the wind turbines that are shutdown. That is, at least one of the wind turbines in the park continues to output power on the local AC grid (although no power is transmitted on the HVDC link). This power is received by the shutdown turbines which uses the power to operate their auxiliary systems. Doing so avoids having alternative energy sources in the wind park such as diesel or gas generators for powering the auxiliary systems in the wind turbines when the HVDC link is non-functional.

In one embodiment, the auxiliary control system used to operate the wind turbines during block 920 is similar to the control system 400 shown in FIG. 4 when the wind turbines are operating in the island mode (grid forming mode) when disconnected from the HVDC link, That is, the auxiliary control system generates power that is primarily dictated by the load (e.g., the power drawn by the auxiliary systems on the shutdown wind turbines) rather than a desired power provided by the turbine controller or the wind park controller.

At block 925, the wind park controller determines if the HVDC link is functional. If not, the method 900 returns to block 920. However, if the HVDC link is functional, the method 900 returns to block 905 where all the wind turbines in the wind park are operated using the primary control system and power is transmitted on the HVDC link. Put differently, when the HVDC link is again functional, the shutdown turbines are restarted and the wind turbines operating using the auxiliary control system are instead operated using the primary control system.

Figure 10:
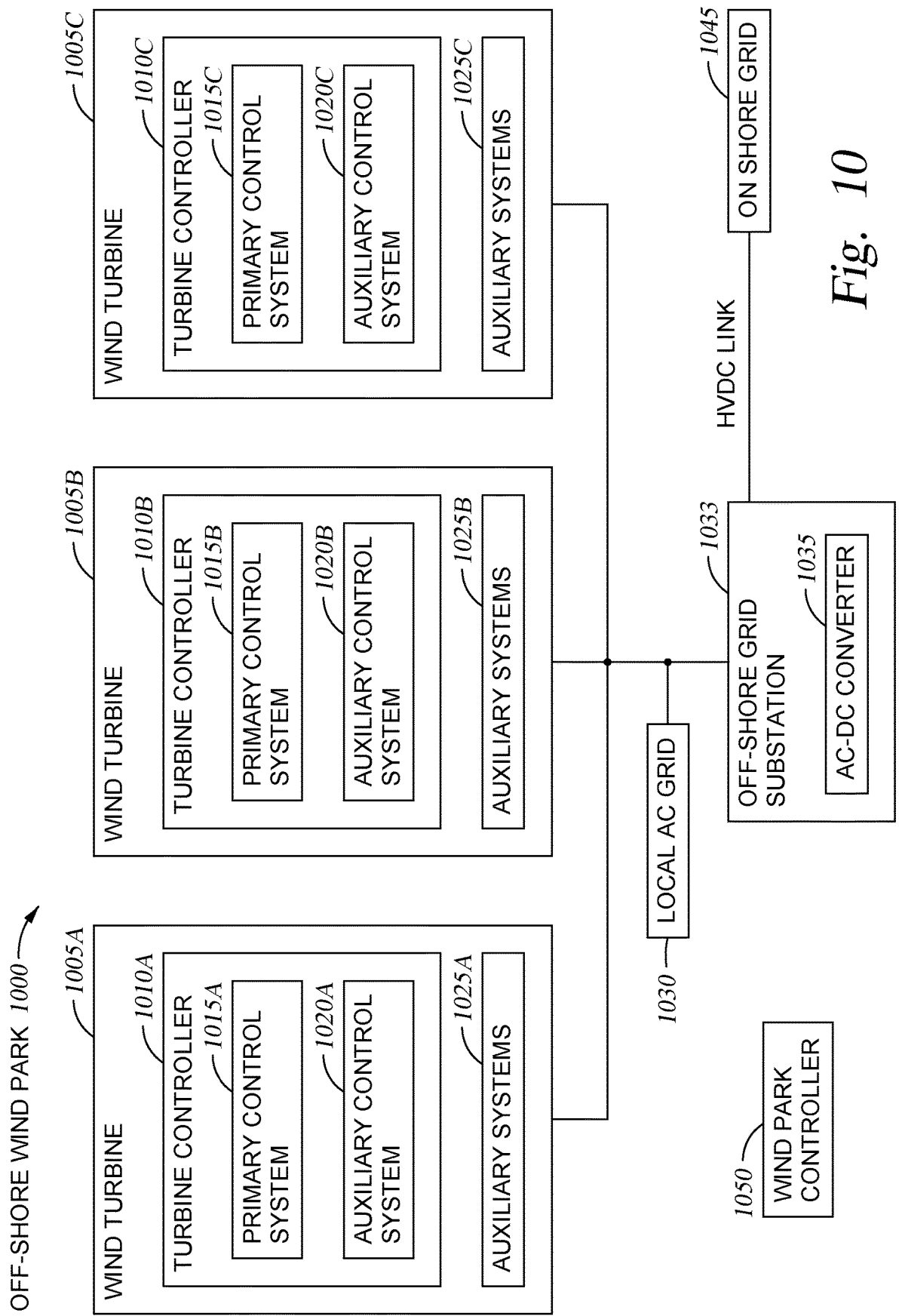
FIG. 10 is a block diagram of a wind park that includes at least one wind turbine that operates in different modes depending on the functionality of the HVDC link according to an embodiment described in this present disclosure.

FIG. 10 is a block diagram of a wind park 1000 that includes multiple wind turbine that operate in different modes as described herein according to an embodiment described in this present disclosure. In the example, the wind park 1000 is an off-shore wind park that is coupled to an on-shore grid 1045 via a HVDC link 1040. However, the embodiments below can also be applied to on-shore wind parks that use an HVDC link 1040 (or a high-voltage alternating-current (HVAC) link) to transmit power to a distant grid.

The wind park 1000 includes three wind turbines 1005A, 1005B, and 10050, each including a turbine controller 1010 and auxiliary system 1025 (e.g., yaw controller/motors, pumps, deicing system, etc.). The turbine controllers 1010 have two separate control systems that control the operation of the respective wind turbines 1005 depending on the functionality of the HVDC link 1040. The turbine controllers 1010 use a primary control system 1015 when the HVDC link 1040 is functional which results in power being transmitted from the park 1000 to the on-shore grid 1045. However, when the HVDC link 1040 is non-functional, the wind park controller 1050 may instruct one or more of the turbine controllers 1010 to instead operate using an auxiliary control system 1020. For example, the three wind turbines 1005 shown here may be designated as back-up wind turbines in the park 1000 that provide power to the auxiliary systems 1020 of all the wind turbines in the park 1000 when the HVDC link 1040 is down. Put differently, all but the three turbines 1005 shown in FIG. 10 in the wind park 1000 may be shut down when the HVDC link is disabled. Instead of being shut down, the wind turbines 1005A, 1005B, and 1005C switch from operating using the primary control system 1015 to operating using the auxiliary control system 1020 which outputs a sufficient amount of power on a local AC grid 1030 to operate the auxiliary systems in the shutdown turbines as well as the auxiliary systems 1025A, 1025B, 1025C on the turbines 1005A, 1005B, and 10050.

As shown, the wind turbines 1005 are coupled to the HVDC link 1040 via an off-shore grid substation 1033 that includes an AC-DC converter 1035. In one embodiment, the off-shore grid substation 1033 is disposed on a platform in the off-shore wind park 1000 and includes a structure that encloses the AC-DC converter 1035. However, in another embodiment, the off-shore grid substation 1033 and AC-DC converter 1035 may be disposed on the same platform but be contained within different enclosures. In either case, the AC-DC converter 1035 is used to convert the power on the local AC grid 1030 into DC power for transmission on the HVDC link 1040.

The AC-DC converter 1035 can be an uncontrolled converter or a controlled converter (e.g., either a self-commutated or an even line-commutated converters). For example, many current off-shore wind parks use a controlled converter to connect the turbines to an on-shore grid. The control techniques described herein can be used regardless of the type of AC-DC converter 1035 used to couple the local AC grid 1030 to the HVDC link 1040. For example, the primary control system 1015 can be a control technique where the AC-DC converter 1035 is actively controlled by the wind park controller 1050. In one embodiment, the power outputted by the wind turbines 1005 when using the primary control system 1015 is determined by the AC-DC converter 1035. That is, the power outputted by the individual wind turbines 1005 may be dictated by the converter 1035 rather than from desired set points transmitted by, for example, the wind park controller 1050.

In addition to providing auxiliary power to the shutdown wind turbines in the park 1000, the wind turbines 1005A-C may also provide power to the off-shore grid substation 1033 and the AC-DC converter 1035 when the HVDC link is non-functional. For example, the substation 1033 and the converter 1035 may include control systems and circuitry that can use the auxiliary power provided by the turbines 1005A-C to operate when there is not an active connection to the on shore grid 1045. Thus, the wind park 1000 may not need generators or battery systems to provide power to the grid substation 1033 and the converter 1035 when the HVDC link 1040 is not functional. In one embodiment, further power may be provided by a power generator e.g. a diesel generator in the substation.

In one embodiment, the auxiliary control system 1020 and the primary control system 1015 are respective software applications or modules that execute depending on the status of the HVDC link. Thus, the wind park controller can instruct the individual turbine controllers to execute either the auxiliary control system 1020 or the primary control system 1015 depending on the status of the HVDC link. For example, the turbine controllers 1010 may include at least one processor and sufficient memory to store the software applications. However, in other embodiments, the auxiliary control system 1020 and the primary control system 1015 include hardware or firmware components.

Furthermore, although FIG. 10 illustrates coupling the wind park 1000 to a HVDC link, in another embodiment, the wind park 1000 is coupled to a HVAC link via an AC-AC converter which converts the AC power signals on the local AC grid 1030 to high-voltage AC power signals suitable for the HVAC link.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for performing black start operations, comprising:
    operating a wind turbine in a wind park in a first mode to provide power to an alternating-current (AC) grid using a control system, wherein the control system comprises a reactive power control leg and an active power control leg, and wherein a controller with an integral action is deactivated or disconnected from the active power control leg during the first mode;
    switching operation of the wind turbine from the first mode to a second mode based on an indication to perform a black start of a main grid, wherein switching from the first mode to the second mode comprises (i) activating the controller which supplies power to the active power control leg or (ii) connecting the controller to the active power control leg, wherein in the second mode, an input of the controller is connected to the active power control leg and an output of the controller is connected to the reactive power control leg such that the controller outputs to the reactive power control leg an adjustment voltage based on an active power produced by the wind turbine to increase output power of the wind turbine; and
    providing power to the main grid while operating in the second mode.

2. The method of claim 1, further comprising energizing a cable array connecting the wind turbine to one or more other wind turbines in a wind park and a transformer of the wind turbine while operating in the first mode.

3. The method of claim 2, further comprising receiving one or more values indicating a block load power to be used for the black start operations, wherein the wind turbine is energized in accordance with the one or more values before the cable array and the transformer are energized.

4. The method of claim 1, further comprising energizing an export cable used to connect the wind park to the main grid before providing power to the main grid.

5. The method of claim 4, wherein the energizing is performed by gradually increasing a voltage of a power signal output by the wind turbine.

6. The method of claim 1, further comprising receiving a second indication that the AC grid is coupled to the main grid by closure of a breaker, wherein the power is provided to the main grid in response to the second indication.

7. The method of claim 1, further comprising detecting a blackout scenario of the main grid, wherein the wind turbine is operated in the first mode in response to the detection of the blackout scenario.

8. The method of claim 7, wherein operating in the first mode comprises:
    receiving power from an uninterruptable power source (UPS), for starting a rotor of the wind turbine; and
    increasing a voltage of a power signal output by the wind turbine to charge a transformer of the wind turbine.

9. The method of claim 1, wherein the power is provided, via the main grid, to a neighboring offshore wind park experiencing a blackout condition.

10. The method of claim 1, wherein the power is provided to an interconnecting node between synchronous zones.

11. The method of claim 1, wherein the power is provided to the main grid from both the wind turbine and an UPS if an amount of power generated by the wind turbine is insufficient to black start the main grid.

12. The method of claim 1, wherein providing power to the main grid comprises providing power to a hybrid power plant for grid forming, wherein the hybrid power plant is located offshore.

13. The method of claim 1, further comprising determining a frequency and a phase of a power signal at the main grid, wherein providing the power while operating in the second mode comprises providing the power at the determined frequency and phase.

14. The method of claim 1, wherein the wind turbine is one of a plurality of wind turbines in a wind park, the method further comprising energizing two or more of the wind turbines that are furthest from each other in the wind park to perform the black start of the main grid.

15. A wind turbine, comprising:
a control system comprising:
   a reactive power control leg,
   an active power control leg, and
   a controller with an integral action, wherein the control system is configured to:
      operate the wind turbine in a first mode to provide power to a local AC grid, wherein the controller is deactivated or disconnected from the active power control leg during the first mode;
      switch operation of the wind turbine from the first mode to a second mode based on an indication to perform a black start of a main grid and by (i) activating the controller which supplies power to the active power control leg or (ii) connecting the controller to the active power control leg, wherein in the second mode, an input of the controller is connected to the active power control leg and an output of the controller is connected to the reactive power control leg such that the controller outputs to the reactive power control leg an adjustment voltage based on an active power produced by the wind turbine to thereby increase output power of the wind turbine; and
      provide power to the main grid while operating in the second mode.

16. The wind turbine of claim 15, wherein the control system is configured to receive a second indication that the AC grid is coupled to the main grid by closure of a breaker, wherein the power is provided to the main grid in response to the second indication.

17. The wind turbine of claim 15, wherein the control system is configured to detect a blackout scenario of the main grid, wherein the wind turbine is operated in the first mode in response to the detection of the blackout scenario.

18. A system, comprising:
a processor;
a memory storing a program that when executed by the processor performs an operation, the operation comprising:
   operating a wind turbine in a wind park in a first mode to provide power to an AC grid using a control system, wherein the control system comprises a reactive power control leg and an active power control leg, and wherein a controller with an integral action is deactivated or disconnected from the active power control leg during the first mode;
   switching operation of the wind turbine from the first mode to a second mode based on an indication to perform a black start of a main grid, wherein switching from the first mode to the second mode comprises (i) activating the controller which supplies power to the active power control leg or (ii) connecting the controller to the active power control leg, wherein in the second mode, an input of the controller is connected to the active power control leg and an output of the controller is connected to the reactive power control leg such that the controller outputs to the reactive power control leg an adjustment voltage based on an active power produced by the wind turbine to thereby increase output power of the wind turbine; and
   providing power to the main grid while operating in the second mode.

19. The system of claim 18, wherein the operation further comprises energizing a cable array connecting the wind turbine to one or more other wind turbines in a wind park and a transformer of the wind turbine while operating in the first mode.

20. The system of claim 19, wherein the operation further comprises receiving one or more values indicating a block load power to be used for the black start operations, wherein the wind turbine is energized in accordance with the one or more values before the cable array and the transformer are energized.

* * * * *